United States Patent
Agarwal et al.

(10) Patent No.: US 9,384,135 B2
(45) Date of Patent: Jul. 5, 2016

(54) SYSTEM AND METHOD OF CACHING HINTED DATA

(71) Applicant: LSI Corporation, San Jose, CA (US)

(72) Inventors: Vineet Agarwal, Kanpur (IN); Ashish Jain, Bangalore (IN); Amit Kumar Sharma, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 400 days.

(21) Appl. No.: 14/017,766

(22) Filed: Sep. 4, 2013

(65) Prior Publication Data
US 2015/0039832 A1     Feb. 5, 2015

(30) Foreign Application Priority Data
Aug. 5, 2013   (IN) .............................. 925/KOL/2013

(51) Int. Cl.
*G06F 12/00*   (2006.01)
*G06F 12/08*   (2016.01)

(52) U.S. Cl.
CPC .................................. *G06F 12/0844* (2013.01)

(58) Field of Classification Search
CPC .... G06F 12/12; G06F 12/121; G06F 12/0804
USPC .......................................................... 711/133
See application file for complete search history.

(56) References Cited

U.S. PATENT DOCUMENTS

2007/0067574 A1*  3/2007  Stempel ................ G06F 12/126
                                                                      711/129
2011/0228674 A1   9/2011  Pais et al.
2012/0117328 A1*  5/2012  McKean ............. G06F 12/0866
                                                                      711/136

FOREIGN PATENT DOCUMENTS

JP            2000181797       6/2000

* cited by examiner

*Primary Examiner* — Matthew Bradley

(57) ABSTRACT

The disclosure is directed to a system and method of cache management for a data storage system. According to various embodiments, the cache management system includes a hinting driver and a priority controller. The hinting driver generates pointers based upon data packets intercepted from data transfer requests being processed by a host controller of the data storage system. The priority controller determines whether the data packets are associated with at least a first (high) priority level or a second (normal or low) priority level based upon the pointers generated by the hinting driver. High priority data packets are stored in cache memory regardless of whether they satisfy a threshold heat quotient (i.e. a selected level of data transfer activity).

20 Claims, 4 Drawing Sheets

SYSTEM AND METHOD OF CACHING HINTED DATA

PRIORITY

The present application claims priority under 35 U.S.C. 119(b) to Indian Patent Application Serial No. 925/KOL/2013, entitled SYSTEM AND METHOD OF CACHING HINTED DATA, By Vineet Agarwal et al., filed Aug. 5, 2013, which is currently co-pending, or is an application of which a currently co-pending application is entitled to the benefit of the filing date.

FIELD OF INVENTION

The disclosure relates to the field of cache management for data storage systems.

BACKGROUND

Data storage systems often include cache memory for storing most frequently used data, also known as data "hot spots." Typically the cache memory is stored on high speed storage media, such as a flash drive or a solid state disk, for improved accessibility. In many systems, the storage and removal of data from cache memory is based upon a priority queue where data priority is determined according to data transfer activity. For example, data may be deemed "hot" if it receives specified number of I/O hits over a certain time interval. When cache memory is substantially filled or at a critical size, the addition of new cache data results in removal of previously cached data residing at a lower priority tier. In some instances, high priority data that is still likely to be used in the near future may be removed from the cache memory for failing to satisfy a threshold heat quotient.

SUMMARY

Various embodiments of the disclosure are directed to a cache management system including at least a hinting driver and a priority controller. The hinting driver is configured to intercept data packets from at least one data transfer request being processed by a host controller in communication with one or more storage devices. The hinting driver is further configured to generate pointers based upon the intercepted data packets. The priority controller is configured to receive the pointers generated by the hinting driver. Based upon the pointers, the priority controller is enabled to determine whether the data packets are associated with a first priority level or a second priority level. The priority controller is further configured to store the data packets in cache memory when the data packets are associated with the first priority level, the first priority level being a higher priority than the second priority level. Accordingly, high priority data packets are stored in cache memory regardless of whether they satisfy a threshold heat quotient (i.e. a selected level of data transfer activity).

It is to be understood that both the foregoing general description and the following detailed description are not necessarily restrictive of the disclosure. The accompanying drawings, which are incorporated in and constitute a part of the specification, illustrate embodiments of the disclosure.

BRIEF DESCRIPTION OF THE DRAWINGS

The embodiments of the disclosure may be better understood by those skilled in the art by reference to the accompanying figures in which.

DETAILED DESCRIPTION

Reference will now be made in detail to the embodiments disclosed, which are illustrated in the accompanying drawings.

Figure 1A:
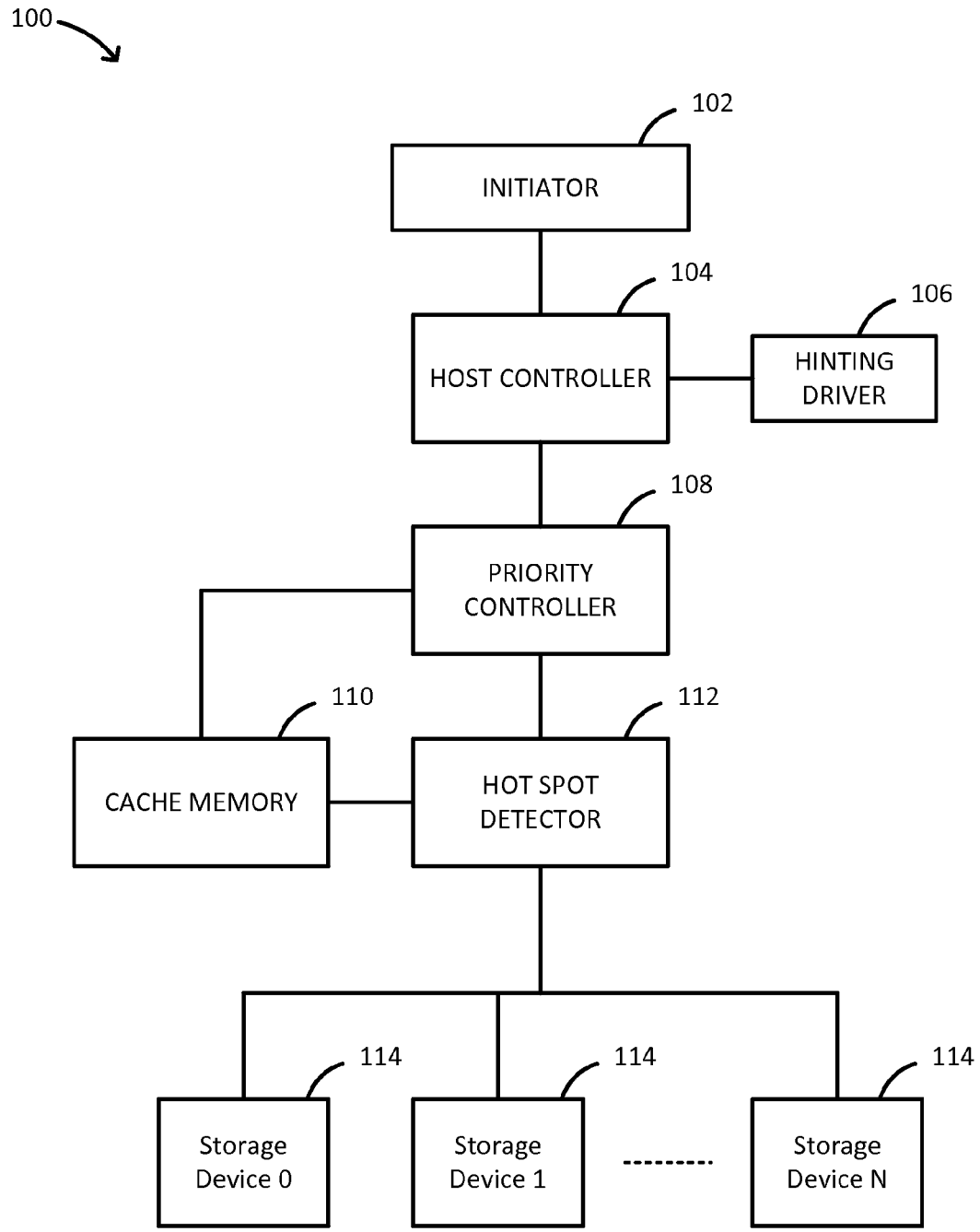
FIG. 1A is a block diagram illustrating cache management architecture within a data storage system, in accordance with an embodiment of the disclosure.
Figure 1B:
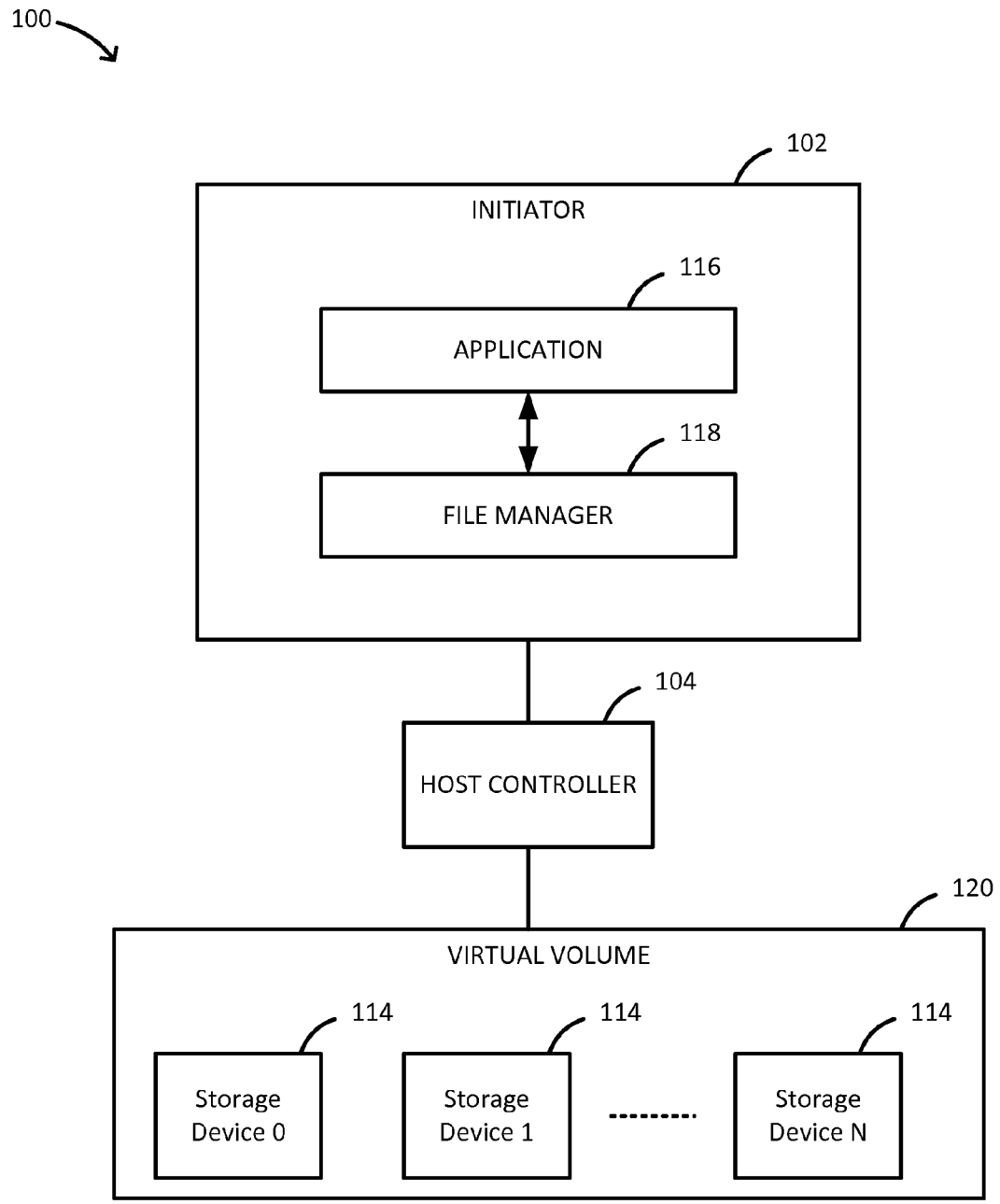
FIG. 1B is a block diagram illustrating the file system layer of a data storage system, in accordance with an embodiment of the disclosure.
Figure 1C:
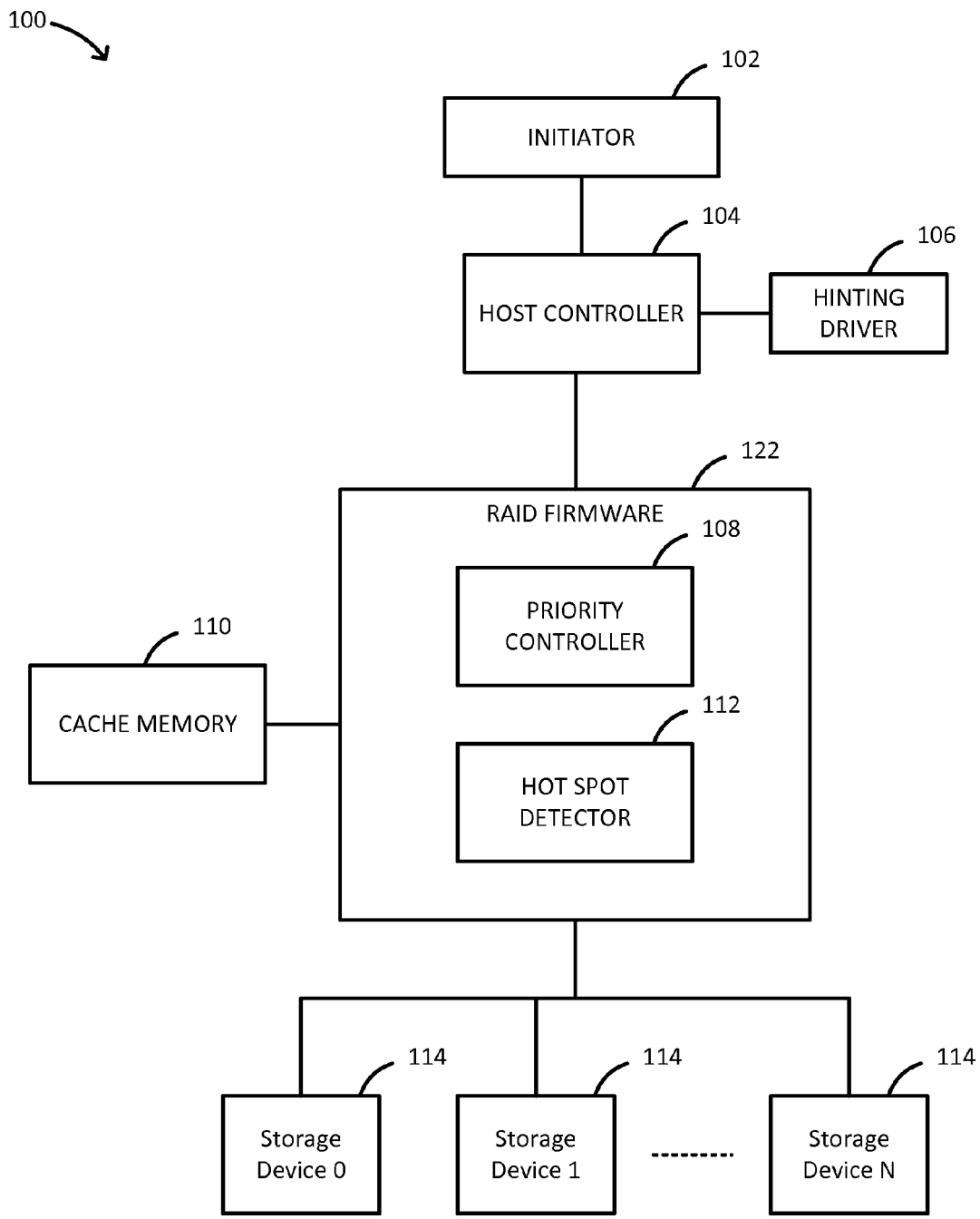
FIG. 1C is a block diagram illustrating cache management architecture within a data storage system, where at least a portion of the cache management architecture is defined by firmware, in accordance with an embodiment of the disclosure.
Figure 2:
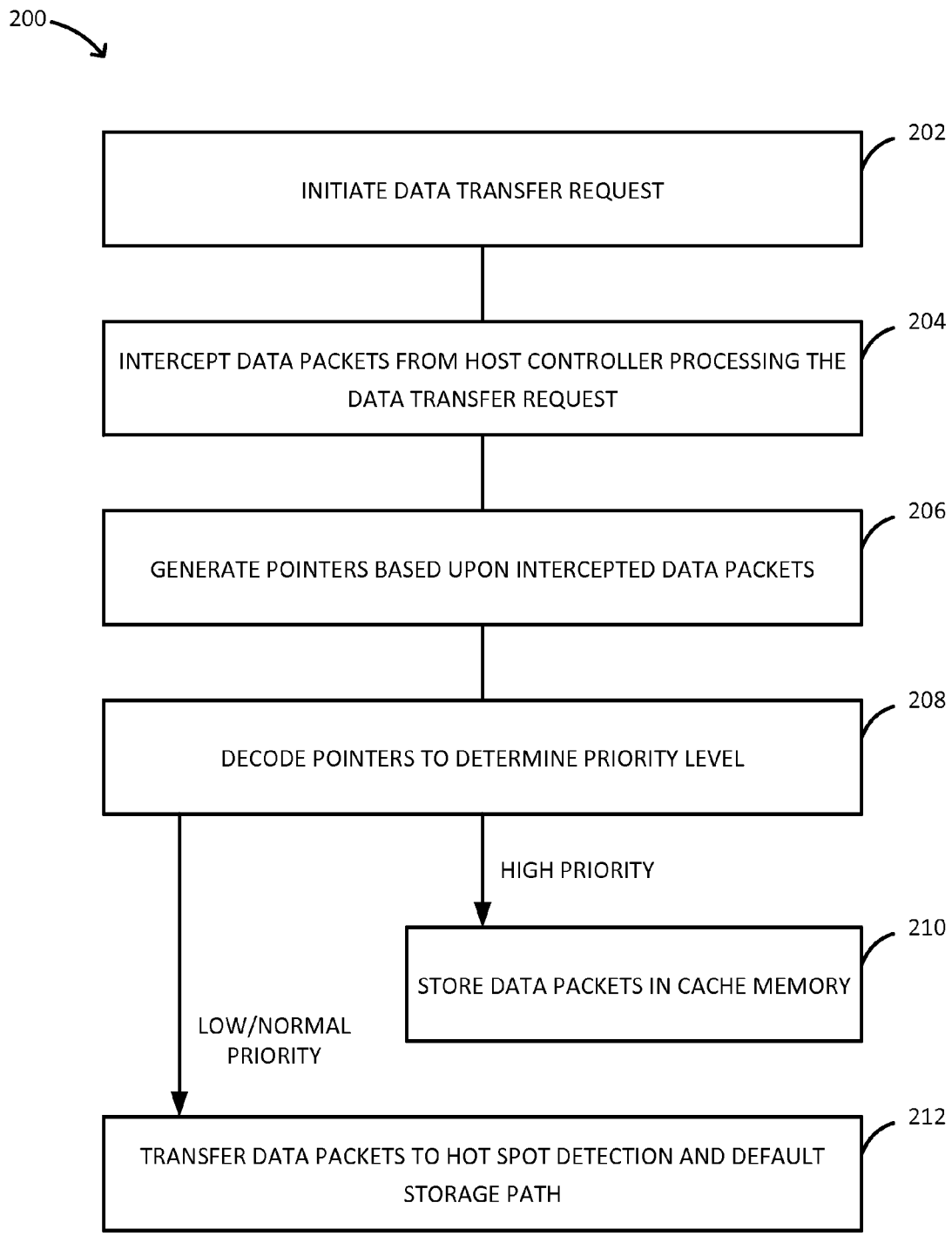
FIG. 2 is a flow diagram illustrating a method of managing cache memory for a data storage system, in accordance with an embodiment of the disclosure.

FIGS. 1A through 2 illustrate a system and method for managing cache memory for a data storage system. In some cache management architectures, such as in NYTRO MEGA-RAID systems, data is cached on high speed media, such as NYTRO flash drives. The high speed media storing the cache memory is divided into a plurality of cache data windows of a selected size, such as 1 Mb each. Caching of data is based upon a most frequently used (MFU) algorithm or a hot spot detection algorithm. Similarly, the removal of data from cache memory is based upon a least recently used (LRU) algorithm.

Reference to any of the MFU, LRU, and hot spot detection algorithms generally defines a priority queue where "hot" data is stored in cache memory when a specified threshold of data transfer activity or heat quotient is achieved. In some embodiments, the threshold level of data transfer activity is satisfied upon receipt of at least three data transfer requests (or "I/O hits"). If no free data windows are available to receive the hot data, then data residing at a low priority tier is removed from cache memory. The data windows freed as a result of removing the cold data from cache memory are then used to cache the hot data.

FIGS. 1A through 1C illustrate cache management architecture for a data storage system 100 enabling high priority data to bypass the hot spot detection algorithm (e.g. three-hit rule). Accordingly, high priority data is written directly to cache memory regardless of whether or not the threshold heat quotient is satisfied. Overall system performance will be improved because high priority data can be written to cache memory without first being deemed "hot" data according to a hot spot detection algorithm.

In an embodiment, as shown in FIG. 1A, the data storage system 100 includes at least one initiator 102 configured to provide data transfer requests to a host controller 104 for execution. In some embodiments, as shown in FIG. 1B, the initiator 102 includes an application module 116 in communication with a file manager 118. The host controller 104 is configured to process a data transfer request (e.g. file creation, deletion, alteration, or migration by an application 116 via the file manager 118) by transferring data to or from one or more communicatively coupled storage devices 114, such as hard disk drives. In some embodiments, multiple storage devices 114 are configured to function as a virtual volume 120 accessible via the host controller 104 as a single (virtual) drive. In some embodiments, the storage devices 114 are configured according to a redundant array of independent disks (RAID)

architecture, such as NYTRO MEGARAID (NMR) architecture developed by LSI Corporation.

Referring again to FIG. 1A, the system 100 further includes a hinting driver 106 in communication with the host controller 104. The hinting driver 106 is configured to receive data packets associated with the data transfer request being processed by the host controller 104. The hinting driver 106 is further configured to generate pointers (e.g. data structures referencing addressable portions of storage memory) based upon the intercepted data packets. The system 100 further includes a priority controller 108 configured to receive the pointers generated by the hinting driver 106. The hinting driver 106 is configured to directly or indirectly (e.g. via the host controller 104) transfer the pointers to the priority controller 108. In some embodiments, the host controller 104 is configured to merge the pointers with the data packets of the data transfer request and send the merged pointers and data packets to the priority controller 108 for processing.

The priority controller 108 is configured to decode the pointers to determine whether the data packets being transferred by the host controller 104 are associated with at least a first priority level or a second priority level. For example, the priority controller 108 may be configured to determine a priority level based upon at least one memory address being referenced by at least one of the pointers. In some embodiments, the data packets being transferred are either assigned a high priority or a default priority. The number and type of priority levels are arbitrary, and as such, many variations can be employed without departing from the scope of the disclosure. For simplicity, the cache management architecture is described according to at least a first priority level and a second priority level, with the first priority level being a higher priority than the second priority level.

The priority controller 108 is in direct or indirect (e.g. via a hot spot detector 112) communication with a cache memory 110. In some embodiments, the cache memory 110 is stored by higher performance media (e.g. one or more flash drives or solid-state disk drives) than the one or more storage devices 114 (e.g. hard disk drives) that define the virtual volume 120. The priority controller 108 is configured to bypass the hot spot detector 112 and store data packets associated with the first priority level (i.e. high priority data packets) to the cache memory 110. Accordingly, the high priority data packets are cached regardless of their respective heat quotient. The priority controller 108 is further configured to process data packets associated with the second priority level (i.e. default or lower priority data packets) through the hot spot detector 112 according to a predefined hot spot detection algorithm.

The hot spot detector 112 is configured to process the data packets, such that data packets failing to satisfy the threshold level of data transfer activity are written to the one or more storage devices 114 according to a default storage path. The hot spot detector 112 is further configured to identify hot spots or hot data packets satisfying the threshold heat quotient, such as those receiving a selected number of I/O hits (e.g. three I/O hits) over a specified time interval (e.g. fixed time interval or total run-time from startup/reset). Data packets deemed "hot" according to the hot spot detector 112 are stored in the cache memory 110. Further, the hot data packets may be stored at a selected tier of the priority queue based upon the pointers.

In some embodiments, the priority controller 108 is further configured to determine movement of data packets in cache memory 110 from a first priority tier to a second priority tier based upon the pointers. Based upon the pointers, the priority controller 108 may raise high priority data packets which are already stored in the cache memory 110 to a higher tier of the priority queue. Accordingly, the high priority data is maintained in the cache memory 110 for an extended period of time.

According to various embodiments, the initiator 102, host controller 104, hinting driver 106, priority controller 108, and hot spot detector 112 include any combination of hardware, software, and firmware configured to perform the respective functions or steps described herein. In some embodiments, one or more of the functions or steps are performed by at least one processor according to program instructions executed from communicatively coupled carrier media. In some embodiments, one or more of the functions or steps are performed by one or more dedicated hardware or firmware controllers. For example, as shown in FIG. 1C, various functions of the priority controller 108 and the hot spot detector 112 may be carried out via RAID firmware, such as NMR firmware or the like.

FIG. 2 illustrates an embodiment of a method 200 of managing cache memory for a data storage system. In some embodiments, method 200 is manifested by the cache management architecture described in embodiments of system 100. As such, method 200 may include a step for carrying out any feature or function described with regards to embodiments of system 100. It is noted, however, that the embodiments of system 100 described herein are not intended to limit method 200. Unless otherwise noted, method 200 should be understood to encompass any system or device configured to execute one or more of the following steps.

At step 202, a data transfer request is initiated by an initiator 102, such as an application 116 accessing a file manager 118 at the file system layer. In some embodiments, the data transfer request is generated in response to the application 116 creating, deleting, altering, or migrating a file via the file manager 118. The resulting data transfer request is sent for execution to a host controller 104 in communication with one or more storage devices 114. In some embodiments, the one or more storage devices 114 define a virtual volume 120 accessible by the file manager 118 via the host controller 104.

At step 204, a hinting driver 106 in communication with the host controller 104 intercepts data packets associated with the data transfer request being processed. At step 206, the hinting driver 106 generates pointers based upon the intercepted data packets. In some embodiments, the pointers include data structures referencing addressable portions of a storage memory. In some embodiments, the hinting driver 106 sends the pointers to the host controller 104 for transmission to a priority controller 108.

At step 208, the priority controller 108 decodes the pointers received directly or indirectly (via the host controller 104) from the hinting driver 106. In some embodiments, the priority controller 108 receives the pointers merged with the data packets from the host controller 104. The priority controller 108 determines a priority level of the data packets based upon the pointers. In some embodiments, the priority controller 108 determines whether the data packets are associated with at least a first (high) priority level or a second (default or low) priority level, as discussed above.

When the priority controller 108 determines that data packets are associated with the first priority level, the method 200 proceeds to step 210. At step 210, the high priority data packets are stored in cache memory regardless of data transfer activity associated with the data packets. Bypassing the hot spot detection algorithm to store high priority data directly to cache memory enables reduced latency and relieves non-caching of high priority data with low heat quotient (i.e. low data transfer activity).

When the priority controller 108 determines that data packets are associated with the second priority level, the method 200 proceeds to step 212. At step 212, the data packets are processed according to a standard data storage path including hot spot detection. In some embodiments, data packets are deemed "hot"—in satisfaction of a threshold of data transfer activity—if the data packets receive a selected number of I/O hits over a specified time interval. Hot data packets are stored in cache memory according to the foregoing hot spot detection algorithm or according to any other hot spot detection algorithm known to the art. Otherwise, the data packets are written to the one or more storage devices 114 without caching.

In some embodiments of system 100 and/or method 200, the data packets are associated with a sequential write command, such as Journal writes performed by a file system. Journal writes are typically performed to maintain the file system integrity. Generally each journal write involves metadata or data updates for writes issued by applications. Other (non-sequential) writes may be blocked until the journal writes are completed to maintain consistency. In some cache management architectures, such as NMR systems, sequential writes are not cached because the heat quotient of sequential writes typically remains below the threshold for hot spot detection. According to any of the foregoing embodiments, the priority controller 108 may be configured to identify data packets associated with a sequential write command (e.g. journal I/O packets) based upon the pointers generated by the hinting driver 106. The sequential writes can be cached, notwithstanding a low heat quotient, if they are associated with or assigned to a high priority level. The foregoing application is illustrative of some embodiments; however, many applications that are not specifically listed herein may benefit from the cache management architectures and techniques described herein. Accordingly, the foregoing example should not be understood to limit the disclosure in any way.

It should be recognized that the various functions or steps described throughout the present disclosure may be carried out by any combination of hardware, software, or firmware. In some embodiments, various steps or functions are carried out by one or more of the following: electronic circuits, logic gates, field programmable gate arrays, multiplexers, or computing systems. A computing system may include, but is not limited to, a personal computing system, mainframe computing system, workstation, image computer, parallel processor, or any other device known in the art. In general, the term "computing system" is broadly defined to encompass any device having one or more processors, which execute instructions from a memory medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a storage medium such as, but not limited to, a read-only memory, a random access memory, a magnetic or optical disk, or a magnetic tape.

It is further contemplated that any embodiment of the disclosure manifested above as a system or method may include at least a portion of any other embodiment described herein. Those having skill in the art will appreciate that there are various embodiments by which systems and methods described herein can be effected, and that the implementation will vary with the context in which an embodiment of the disclosure deployed.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A system for cache management, comprising:
    a hinting driver configured to receive data packets of a data transfer request being processed by a host controller in communication with one or more storage devices, and further configured to generate pointers based upon the data packets; and
    a priority controller configured to receive the pointers generated by the hinting driver, and further configured to determine, based upon the pointers, whether the data packets are associated with a first priority level or a second priority level, the first priority level being a higher priority than the second priority level, wherein the priority controller sends the data packets to a data transfer activity detector when the data packets are associated with the second priority level, wherein the priority controller stores the data packets in a cache memory when the data packets are associated with the first priority level, wherein directly storing the data packets in a cache memory bypasses the data transfer activity detector.

2. The system of claim 1, wherein the hinting driver is further configured to send the pointers to the host controller, and wherein the priority controller is configured to receive the pointers from the host controller.

3. The system of claim 2, wherein the priority controller is further configured to receive the data packets merged with the pointers from the host controller.

4. The system of claim 1, wherein the data transfer activity detector is a hot spot detector.

5. The system of claim 1, wherein the data packets are associated with a sequential write command.

6. The system of claim 5, wherein the sequential write command includes a journal write command.

7. The system of claim 5, wherein the sequential write command is included in a series of sequential write commands requiring blockage of non-sequential write commands pending execution of the series of sequential write commands.

8. A system for cache management, comprising:
    a host controller in communication with one or more storage devices, the host controller configured to process a data transfer request issued by an initiator;
    a hinting driver configured to receive data packets of the data transfer request being processed by the host controller, and further configured to generate pointers based upon the data packets;
    a priority controller configured to receive the pointers generated by the hinting driver, and further configured to determine, based upon the pointers, whether the data packets are associated with a first priority level or a second priority level, the first priority level being a higher priority than the second priority level, wherein the priority controller stores the data packets in a cache memory when the data packets are associated with the first priority level; and
    a hot spot detector configured to receive the data packets from the priority controller when the data packets are associated with the second priority level, and further configured to determine whether the data packets satisfy a threshold of data transfer activity.

9. The system of claim 8, wherein the hinting driver is further configured to send the pointers to the host controller, and wherein the priority controller is configured to receive the pointers from the host controller.

10. The system of claim 9, wherein the priority controller is further configured to receive the data packets merged with the pointers from the host controller.

11. The system of claim 8, wherein the hot spot detector is further configured to store the data packets in the cache memory when the data packets satisfy the threshold of data transfer activity.

12. The system of claim 8, wherein the threshold of data transfer activity is defined by at least three data transfer requests over a specified time interval.

13. The system of claim 8, wherein the data packets are associated with a sequential write command.

14. The system of claim 13, wherein the sequential write command is included in a series of sequential write commands requiring blockage of non-sequential write commands pending execution of the series of sequential write commands.

15. A method of cache management, comprising:
generating pointers based upon data packets of a data transfer request being processed by a host controller in communication with one or more storage devices;
determining, based upon the pointers, whether the data packets are associated with a first priority level or a second priority level, the first priority level being a higher priority level than the second priority level; and
bypassing data transfer activity detection by directly storing the data packets in a cache memory when the data packets are associated with the first priority level.

16. The method of claim 15, further comprising:
sending the pointers from a hinting driver to the host controller;
merging the data packets with the pointers via the host controller; and
sending the data packets merged with the pointers from the host controller to a priority controller.

17. The method of claim 15, further comprising:
sending the data packets to a hot spot detector when the data packets are associated with the second priority level.

18. The method of claim 17, further comprising:
determining whether the data packets satisfy a threshold of data transfer activity; and
storing the data packets in the cache memory when the data packets satisfy the threshold of data transfer activity.

19. The method of claim 15, wherein the data transfer request includes a sequential write command from a series of sequential write commands, and wherein non-sequential write commands are blocked pending execution of the series of sequential write commands.

20. The system of claim 4, wherein the hot spot detector is further configured to store the data packets in the cache memory when the data packets satisfy a threshold of data transfer activity.

* * * * *